United States Patent [19]

Grigorova et al.

[11] Patent Number: 5,895,772
[45] Date of Patent: Apr. 20, 1999

[54] CATALYST HAVING A ZIRCONIUM OXIDE AND/OR CERIUM OXIDE SUPPORT AND CONTAINING GOLD AND A TRANSITION METAL OXIDE

[76] Inventors: Bojidara Grigorova, 52 Morsim Rd., Hyde Park, Sandton; Atanas Palazov, 15 Pitchford Rd. Northcliff; John Mellor, 22 Bedford Ave., Craighall Park, both of Johannesburg; James Anthony Jude Tumilty, 7B First Ave., Rivonia, Sandton; Anthony Harold Gafin, 64 Fir Rd., Glenhazel, Johannesburg, all of South Africa

[21] Appl. No.: 08/956,756

[22] Filed: Oct. 22, 1997

Related U.S. Application Data

[63] Continuation of application No. 08/551,148, Oct. 31, 1995, abandoned.

[30] Foreign Application Priority Data

| Nov. 2, 1994 | [ZA] | South Africa | 94/8626 |
| Nov. 15, 1994 | [ZA] | South Africa | 94/9054 |

[51] Int. Cl.$^6$ ............................ B01J 23/00; B01J 23/58
[52] U.S. Cl. ........................ 502/304; 502/330; 502/344; 502/349
[58] Field of Search ................ 502/304, 330, 502/344, 349, 302, 303, 328, 242, 243, 250, 258, 260, 263

[56] References Cited

U.S. PATENT DOCUMENTS

| 4,271,044 | 6/1981 | Fratzer et al. . | |
| 4,957,896 | 9/1990 | Matsumoto et al. | 502/304 |
| 5,073,532 | 12/1991 | Domesle et al. . | |
| 5,120,695 | 6/1992 | Blumrich et al. . | |
| 5,139,992 | 8/1992 | Tauster et al. . | |
| 5,492,878 | 2/1996 | Fujii et al. . | |
| 5,532,198 | 7/1996 | Chopin et al. . | |
| 5,665,668 | 9/1997 | Grigorova et al. | 502/344 |

FOREIGN PATENT DOCUMENTS

| 354664 | 2/1990 | European Pat. Off. | 502/304 |
| WO 94/19092 | 9/1994 | WIPO . | |
| WO 95/19843 | 7/1995 | WIPO . | |

*Primary Examiner*—Steven Bos
*Attorney, Agent, or Firm*—Fish & Richardson P.C.

[57] ABSTRACT

A catalyst is provided with is suitable for catalysing the oxidation of carbon monoxide and hydrocarbons and reducing hazardous nitrous oxides. The catalyst comprises an oxide support selected from zirconium oxide, cerium oxide and mixtures thereof having captured thereon a noble metal in catalytically effective form and preferably also a transition metal oxide. The preferred catalyst has gold as the noble metal and cobalt oxide, having a spinel structure, as the transition metal oxide. The gold in such catalyst is associated with the cobalt oxide.

21 Claims, No Drawings

CATALYST HAVING A ZIRCONIUM OXIDE AND/OR CERIUM OXIDE SUPPORT AND CONTAINING GOLD AND A TRANSITION METAL OXIDE

This is a continuation of application Ser. No. 08/551,148, filed Oct. 31, 1995, now abandoned.

BACKGROUND OF THE INVENTION

This invention relates to a catalyst.

PCT/GB 94/00321 discloses a catalyst for use in the oxidation of carbon monoxide and hydrocarbons which comprises a porous alumina support having captured thereon a complex comprising gold, a transition metal selected from cobalt and manganese, and the alumina, the concentration of gold on the support being less than 2 percent by mass of the catalyst, and the atomic ratio of gold to transition metal being in the range 1:30 to 1:200. Of these catalysts, the preferred catalyst is one which has cobalt as the transition metal. The alumina is said to have a large surface area, typically 80 to 400m$^2$/g.

PCT/GB 95/00136 discloses a method of preparing a catalyst containing at least two metals, at least one of which is capable of forming a reducible oxide, captured on a porous support which includes the steps of providing solutions of the two metals, impregnating the support with one of the solutions exposing the impregnated support to a reducing atmosphere at a temperature exceeding 300° C. and impregnating the thus treated support with the other solution. U.S. Pat. No. 4,957,896 discloses a catalyst for purification of exhaust gases comprising a support substrate, an active alumina coating layer comprising at least one of nickel oxide and cobalt oxide formed on the surface of the support substrate, a composite oxide comprising cerium oxide and zirconium oxide formed in the active alumina coating layer, and a noble metal loaded on the active alumina coating layer. The noble metal may be platinum, palladium or rhodium. The composite oxide of cerium oxide and zirconium oxide is provided to prevent deterioration of the effect of suppressing the hydrogen sulphide emission by the nickel oxide and/or cobalt oxide and not as a support for the catalyst.

SUMMARY OF THE INVENTION

According to the present invention, a catalyst comprises an oxide support selected from zirconium oxide, cerium oxide and mixtures thereof having captured thereon a noble metal in catalytically effective form.

DESCRIPTION OF EMBODIMENTS

The oxide support in the catalyst of the invention is zirconium oxide, cerium oxide or a mixture thereof in contrast to prior art catalysts which use oxides such as alumina, silica, aluminosilicates, titania and the like. Thus, the oxide support will be present in the catalyst in an amount of at least 50% by mass of the catalyst, and generally at least 60% by mass of the catalyst. The support may be zirconium oxide on its own or cerium oxide on its own. It is preferred that a mixture of such oxides are used. When the support comprises a mixture of these oxides, the cerium oxide will generally constitute at least 50% by mass of the mixture. The preferred mass ratio of cerium oxide to zirconium oxide is in the range 5:1 to 2:1, typically about 3:1.

The catalyst contains a noble metal in catalytically effective form. This form will vary according to the nature of the catalyst. The noble metal will generally be gold, platinum, palladium, rhodium or silver. Gold is the preferred noble metal.

The concentration of the noble metal will generally be low, i.e. less than 2% by mass of the catalyst. Preferably the noble metal concentration is of the order 0.1 to 0.5% by mass of the catalyst.

The catalyst preferably also contains a transition metal in oxide form. The transition metal oxide preferably has a spinel structure. Examples of transition metal oxides which form spinel structures are cobalt oxide ($Co_3O_4$) and ferric oxide ($Fe_3O_4$).

When the noble metal is gold, the preferred catalyst also contains a transition metal oxide having a spinel structure and to which the gold is associated, e.g. complexed.

The catalyst will also preferably contain a dopant capable of improving the thermal stability thereof. Examples of suitable dopants are alkaline earth metal oxides, silicon dioxide and oxides of metals of the lanthanide series.

Examples of suitable metal oxides are calcium oxide, barium oxide, silicon dioxide, lanthanum oxide ($La_2O_3$) yttrium oxide ($Y_2O_3$) and neodynium oxide ($Nd_2O_3$). A particularly preferred dopant is a mixture of lanthanum oxide and neodynium oxide. When present, the dopant will typically be present in the catalyst in an amount of up to 15% by mass, preferably 2 to 10% by mass, of the catalyst.

The oxide support will be porous and able to capture as much of the noble metal/transition metal oxide thereon as possible. The oxide support should have as large a surface area as possible, typically 80 to 200m$^2$/g. The oxide support may take any suitable form such as a monolith, an extrudate, pellets, rings, pearls or preferably a powder.

The ratio of noble metal to transition metal, when present, in the catalyst, can vary over a wide range. Generally, the atomic ratio of noble metal to the transition metal will not exceed 1:200.

The catalyst, when it contains both a noble metal and a transition metal oxide, is preferably made by the method described in PCT/GB 95/00136. The method involves impregnating the oxide support with a solution of the transition metal, optionally drying the product, exposing the impregnated product to a reducing atmosphere such as hydrogen or carbon monoxide at a temperature exceeding 300° C., impregnating the thus treated product with a solution of the noble metal and drying the impregnated product. The catalyst may be activated by exposing it to a temperature of at least 300° C., typically 300 to 700° C., in the presence of oxygen. The oxygen may be air or oxygen mixed with another gas, or pure or substantially pure oxygen.

The catalyst of the invention, particularly one containing gold and a transition metal oxide having a spinel structure, has been found to be effective in the oxidation of carbon monoxide and hydrocarbons at low and high temperatures and reducing nitrous oxides. This makes the catalyst suitable, for example, for use in the exhaust system of motor vehicles, gas safety masks, the purification of air in industrial processes and undergound operations, the purification of various industrial effluent gases and the recycling of carbon dioxide in lasers. The catalysts have also been found to be capable of catalysing the degradation of ozone.

An example of the invention will now be described. A mixture of zirconium oxide and cerium oxide powder was dried in an oven at 120° C. for a period of about 2 hours. The powder had a surface area of approximately 80 to 100 m$^2$/g and the ratio of cerium oxide to zirconium oxide, on a mass basis, was approximately 3:1.

The powder mixture was mixed with a small amount of lanthanum oxide and neodynium oxide powders.

The powdered mixture was impregnated with a cobalt nitrate solution containing about 2.7 mol $l^{-1}$ of cobalt nitrate.

The cobalt nitrate impregnated support was dried for a period of 6 to 24 hours at 120° C. causing some decomposition of the nitrate to the oxide. Following drying, the material was heated at 500° C. under flowing hydrogen (30 ml/min) and held at this temperature for 20 minutes. This caused the cobalt nitrate/oxide to be reduced. Following this, the material was cooled in flowing hydrogen to room temperature. The material was thereafter optionally kept in nitrogen or exposed to air at a temperature of less than 40° C.

The thus treated product was impregnated with a gold solution, i.e. tetrachloroauric acid solution (0.007 mol $l^{-1}$) and dried.

The impregnated support was dried and activated by heating it in a flow of oxygen or air (30 ml/min) and at a temperature of about 500° C. This activation was maintained for a period of 10 to 30 minutes.

The catalyst produced by this method was found to be effective in catalysing the oxidation of carbon monoxide and hydrocarbons and reducing nitrous oxide gases.

The catalyst was found to have the following composition (percentages by mass).

0.5% gold, 19.5% cobalt, 70% zirconium oxide/cerium oxide.

5% lanthanum oxide and 5% neodynium oxide as dopant.

Cobalt oxide ($Co_3O_4$) having a spinel structure.

Gold in association (complexed) with the cobalt oxide spinel.

The gold/cobalt oxide/zirconium oxide—cerium oxide catalyst as described above was compared in its catalytic activity in the oxidation of hydrocarbons and carbon monoxide with a gold/cobalt oxide/alumina catalyst of the type described and claimed in PCT/GB 94/00321. The results obtained are set out in Table 1.

TABLE 1

| Temperature | $Au\text{-}Co_3O_4/CeO_2ZrO_2$ | | $Au\text{-}Co_3O_4/Al_2O_3$ | |
|---|---|---|---|---|
| (°C.) | CO % | HC % | CO % | HC % |
| 30 | 75 | 58 | 47 | 21 |
| 200 | 97 | 22 | 70 | 12 |
| 250 | 100 | 68 | 100 | 51 |
| 300 | 100 | 80 | 100 | 70 |
| 400 | 100 | 99 | 100 | 87 |
| 500 | 100 | 100 | 100 | 97 |

It will be noted from the above that the catalyst of the invention has significantly better oxidation catalytic activity, particularly in the oxidation of hydrocarbons at lower temperatures.

The catalytic activity of a gold/cobalt oxide/zirconium oxide—cerium oxide catalyst as described above, with and without lanthanum and neodynium dopants, were also compared in their ability to catalyse the oxidation of carbon monoxide and hydrocarbons. The results obtained are set out in Table 2.

TABLE 2

| Temperature | With La, Nd dopants | | Without La, Nd dopants | |
|---|---|---|---|---|
| (°C.) | CO % | HC % | CO % | HC % |
| 30 | 75 | 58 | 50 | 39 |
| 200 | 97 | 22 | 92 | 19 |
| 300 | 100 | 80 | 100 | 77 |
| 400 | 100 | 99 | 100 | 99 |
| 500 | 100 | 100 | 100 | 100 |
| 600 | 100 | 100 | 100 | 100 |
| 700 | 100 | 100 | 100 | 100 |
| 600 | 100 | 100 | 100 | 100 |
| 500 | 100 | 100 | 100 | 100 |
| 400 | 100 | 89 | 100 | 79 |

The catalyst with the dopants proved to be thermally more stable than the catalyst without the dopants and had better oxidation catalytic activity at low temperatures.

We claim:

1. A catalyst having an oxide support selected from the group consisting of zirconium oxide, cerium oxide and mixtures thereof, said catalyst comprising the oxide support having captured thereon gold in catalytically effective form and a transition metal oxide having a spinel structure, the gold being associated with the transition metal oxide, wherein the oxide support is present in the catalyst in an amount of at least 50% by mass of the catalyst.

2. A catalyst according to claim 1 wherein the oxide support is present in the catalyst in an amount of at least 60% by mass of the catalyst.

3. A catalyst according to claim 1 wherein the cerium oxide constitutes at least 50% by mass of the mixture.

4. A catalyst according to claim 1 wherein the mass ratio of cerium oxide to zirconium oxide is in the range 5:1 to 2:1.

5. A catalyst according to claim 1 wherein the transition metal oxide is selected from cobalt oxide and ferric oxide.

6. A catalyst according to claim 1 which also contains a dopant capable of improving the thermal stability thereof.

7. A catalyst according to claim 6 wherein the dopant is selected from alkaline earth metal oxides, silicon dioxide and oxides of metals of the lanthanide series.

8. A catalyst according to claim 6 wherein the dopant is selected from calcium oxide, barium oxide, silicon dioxide, lanthanum oxide, yttrium oxide and neodynium oxide.

9. A catalyst according to claim 6 wherein the dopant is a mixture of lanthanum oxide and neodynium oxide.

10. A catalyst according to claim 6 wherein the dopant is present in the catalyst in an amount of up to 15% by mass of the catalyst.

11. A catalyst according to claim 6 wherein the dopant is present in the catalyst in an amount of 2 to 10% by mass of the catalyst.

12. A catalyst according to claim 1 wherein the oxide support has a surface area of 80 to 200 $m^2/g$.

13. A catalyst according to claim 1 wherein the oxide support has the form of a monolith, an extrudate, pellets, rings, pearls or powder.

14. A catalyst having an oxide support present in the catalyst in an amount of at least 50 percent by weight of the catalyst and the oxide support being a mixture of zirconium oxide and cerium oxide wherein the cerium oxide constitutes at least 50 percent by mass of the mixture, said catalyst comprising the oxide support, gold, in catalytically effective form, and a transition metal in oxide form having a spinel structure captured on the oxide support.

15. A catalyst according to claim 14 wherein the mass ratio of cerium oxide to zirconium oxide is in the range 5:1 to 2:1.

16. A catalyst according to claim 15, wherein the transition metal oxide is selected from cobalt oxide and ferric oxide.

17. A catalyst according to claim 14 which also contains a dopant capable of improving the thermal stability thereof.

18. A catalyst according to claim 17 wherein the dopant is selected from alkaline earth metal oxides, silicon dioxide and oxides of metals of the lanthanide series.

19. A catalyst having an oxide support present in the catalyst in an amount of at least 50 percent by mass of the catalyst and the oxide support being a mixture of zirconium oxide and cerium oxide, the cerium oxide constituting at least 50 percent by mass of the mixture and the mass ratio cerium oxide to zirconium oxide being in the range 5:1 to 2:1, said catalyst comprising the oxide support, gold, in catalytically effective form, and a transition metal oxide having a spinel structure, the gold and the transition metal oxide captured on the oxide support, the gold being associated with the transition metal oxide and a dopant capable of improving the terminal stability thereof and being selected from alkaline earth metal oxides, silicon dioxide and oxides of metals of the lanthanide series.

20. A catalyst according to claim 19 wherein the dopant is present in the catalyst in an amount of up to 15 percent by mass of the catalyst.

21. A catalyst according to claim 20 wherein the dopant is a mixture of lanthanum oxide and neodynium oxide.

* * * * *